United States Patent
Orzelek et al.

(10) Patent No.: US 12,065,093 B2
(45) Date of Patent: Aug. 20, 2024

(54) BUMPER ARRANGEMENT WITH END-SIDE HOLLOW PROFILE

(71) Applicant: BENTELER AUTOMOBILTECHNIK GMBH, Paderborn (DE)

(72) Inventors: Patrick Orzelek, Delbruek (DE); Stephan Rabl, Ingolstadt (DE); Mirko Paare, Paderborn (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 156 days.

(21) Appl. No.: 17/590,443

(22) Filed: Feb. 1, 2022

(65) Prior Publication Data
US 2022/0242348 A1    Aug. 4, 2022

(30) Foreign Application Priority Data
Feb. 2, 2021    (DE) ............... 10 2021 102 368.8

(51) Int. Cl.
*B60R 19/18*    (2006.01)
*B60R 19/12*    (2006.01)
*B60R 19/34*    (2006.01)

(52) U.S. Cl.
CPC .............. *B60R 19/18* (2013.01); *B60R 19/12* (2013.01); *B60R 19/34* (2013.01)

(58) Field of Classification Search
CPC ............. B60R 19/34; B60R 19/023; B60R 2019/1813; B60R 19/18; B60R 19/12; B60R 2019/1806; B60R 2019/182
(Continued)

(56) References Cited

U.S. PATENT DOCUMENTS

| | | | | |
|---|---|---|---|---|
| 5,785,367 A | * | 7/1998 | Baumann | B62D 21/15 293/133 |
| 7,735,902 B2 | * | 6/2010 | Wurtemberger | B62D 25/082 293/133 |

(Continued)

FOREIGN PATENT DOCUMENTS

| | | |
|---|---|---|
| DE | 102005018348 A1 | 11/2005 |
| DE | 102017124590 A1 | 4/2019 |

(Continued)

OTHER PUBLICATIONS

Extended European Search Report for European Application No. 22154145.1 mailed Jun. 13, 2022; 14pp.

(Continued)

*Primary Examiner* — James A Shriver, II
*Assistant Examiner* — Melissa Ann Bonifazi
(74) *Attorney, Agent, or Firm* — HAUPTMAN HAM, LLP

(57) ABSTRACT

A bumper arrangement relating to a motor vehicle, having an upper main crossmember, which is able to be coupled to the motor vehicle by way of crash boxes, and a lower auxiliary crossmember wherein the main crossmember and the auxiliary crossmember are coupled to one another by way of vertical struts, wherein the bumper arrangement extends over at least 70% of the vehicle width, and in that the main crossmember and the auxiliary crossmember have end portions which protrude laterally in the motor vehicle transverse direction with respect to the crash boxes. A vertically oriented hollow profile is arranged in an outer portion of the end region.

14 Claims, 8 Drawing Sheets

Figure 2D:
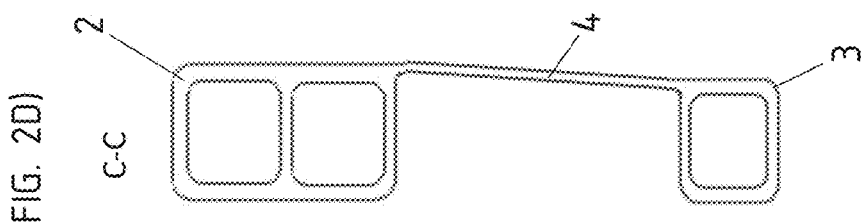

(58) Field of Classification Search
USPC ....... 293/133, 149, 152, 154, 155, 132, 122, 293/102
See application file for complete search history.

(56) References Cited

U.S. PATENT DOCUMENTS

| | | | |
|---|---|---|---|
| 9,352,713 B2* | 5/2016 | Bryer | ................... B60R 19/34 |
| 2010/0052342 A1 | 3/2010 | Wurtemberger | |
| 2013/0187396 A1* | 7/2013 | Brockhoff | ............... B60R 19/24 |
| | | | 293/146 |
| 2015/0021939 A1 | 1/2015 | Bryer et al. | |
| 2020/0231107 A1 | 7/2020 | Guenther et al. | |
| 2022/0153215 A1 | 5/2022 | Paare et al. | |

FOREIGN PATENT DOCUMENTS

| | | | | |
|---|---|---|---|---|
| DE | 202020005403 U1 | 2/2021 | | |
| DE | 202021103263 U1 | 6/2021 | | |
| EP | 3858683 A1 | 8/2021 | | |
| EP | 4001022 A1 | 5/2022 | | |
| WO | 2019034483 A1 | 2/2019 | | |
| WO | WO-2021151787 A1 * | 8/2021 | ............. | B60R 19/04 |

OTHER PUBLICATIONS

Office Action for Chinese Application No. 202210109516.4 mailed May 16, 2024; 16pp.

* cited by examiner

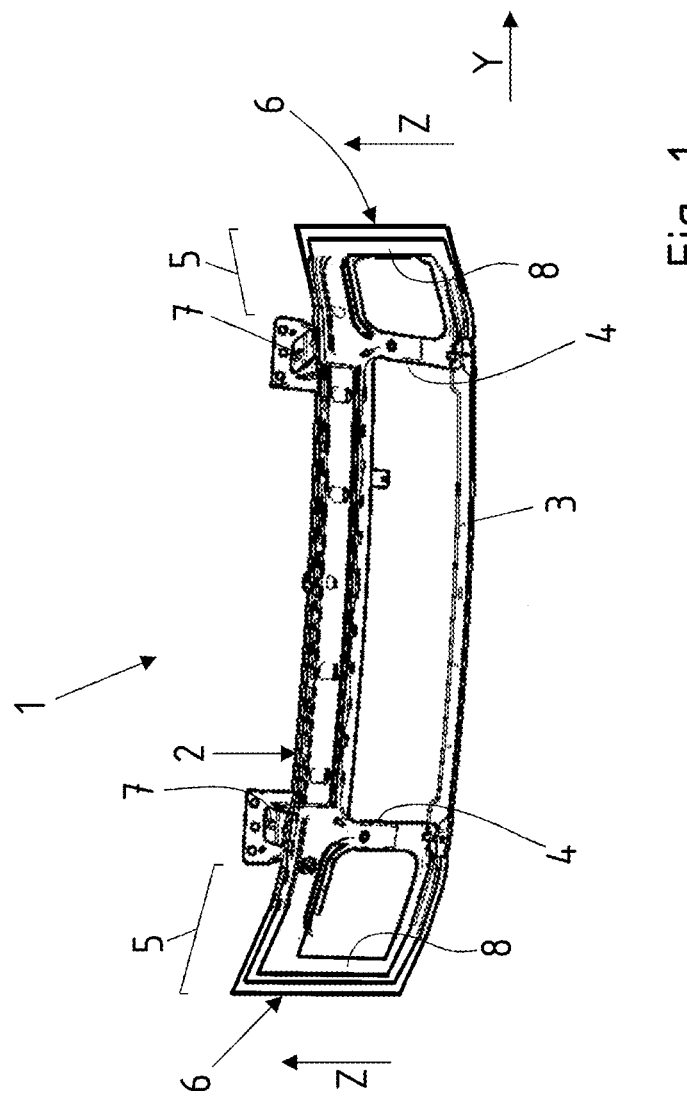

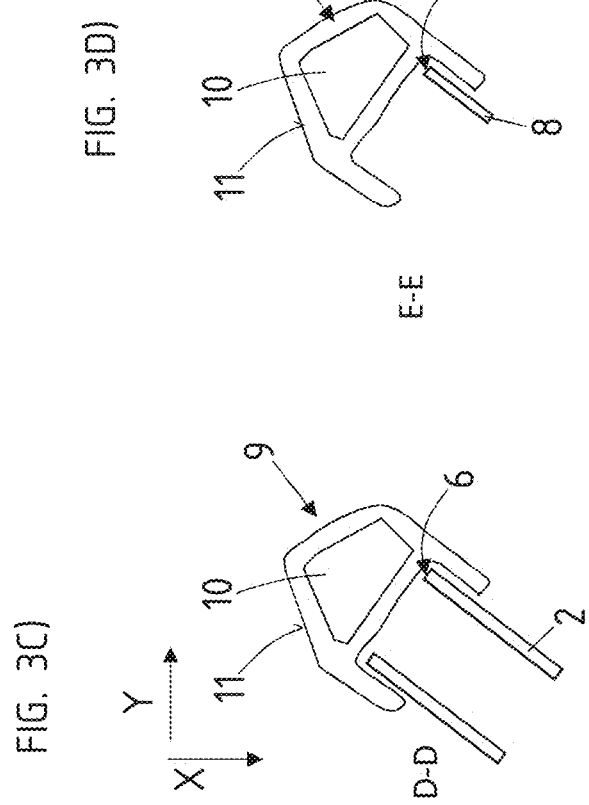
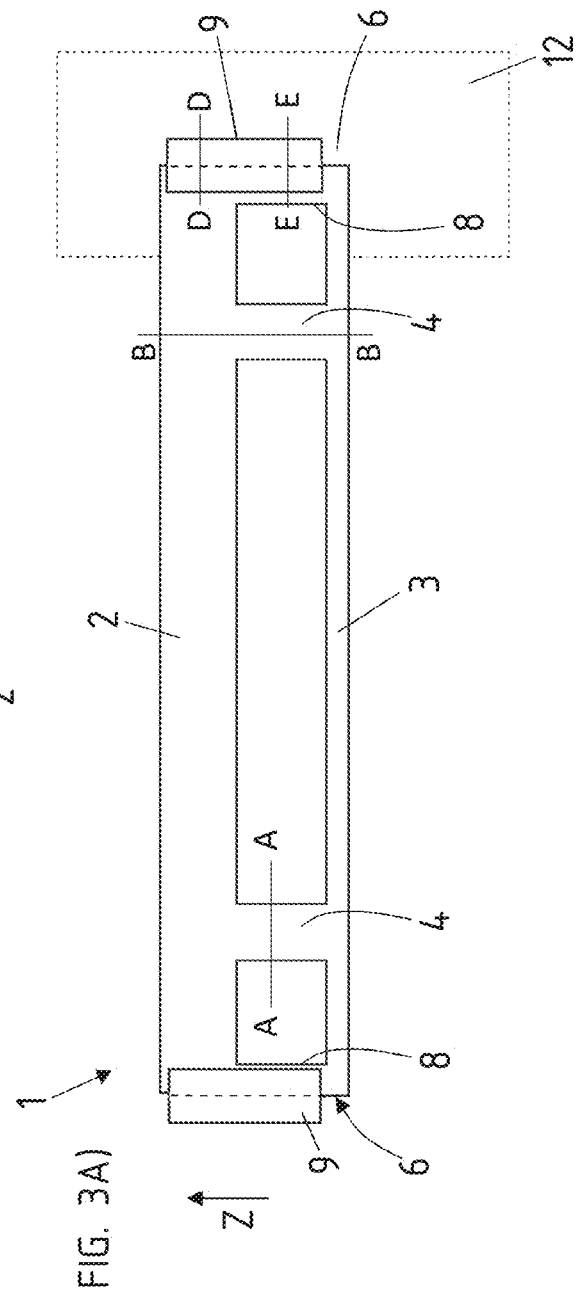

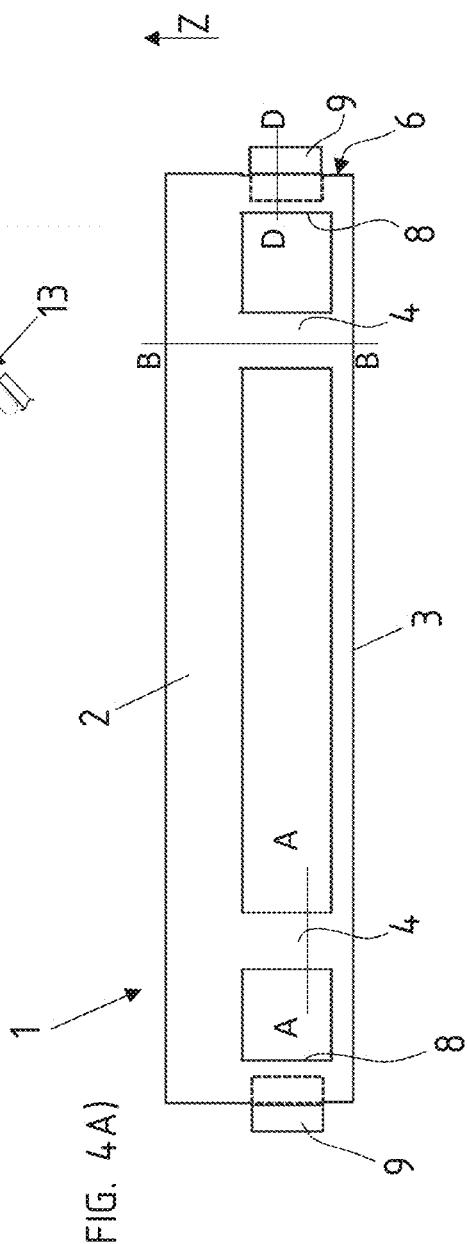
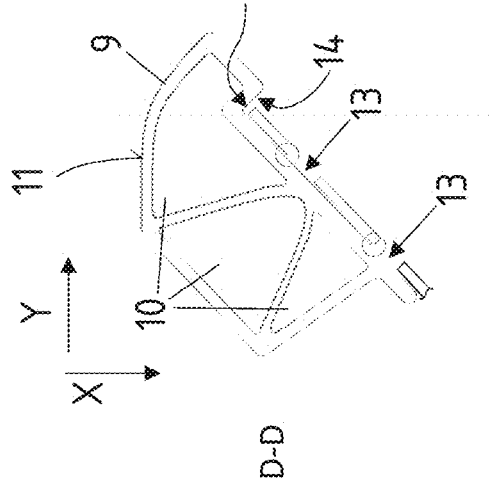
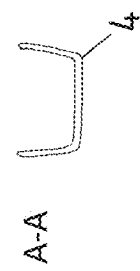

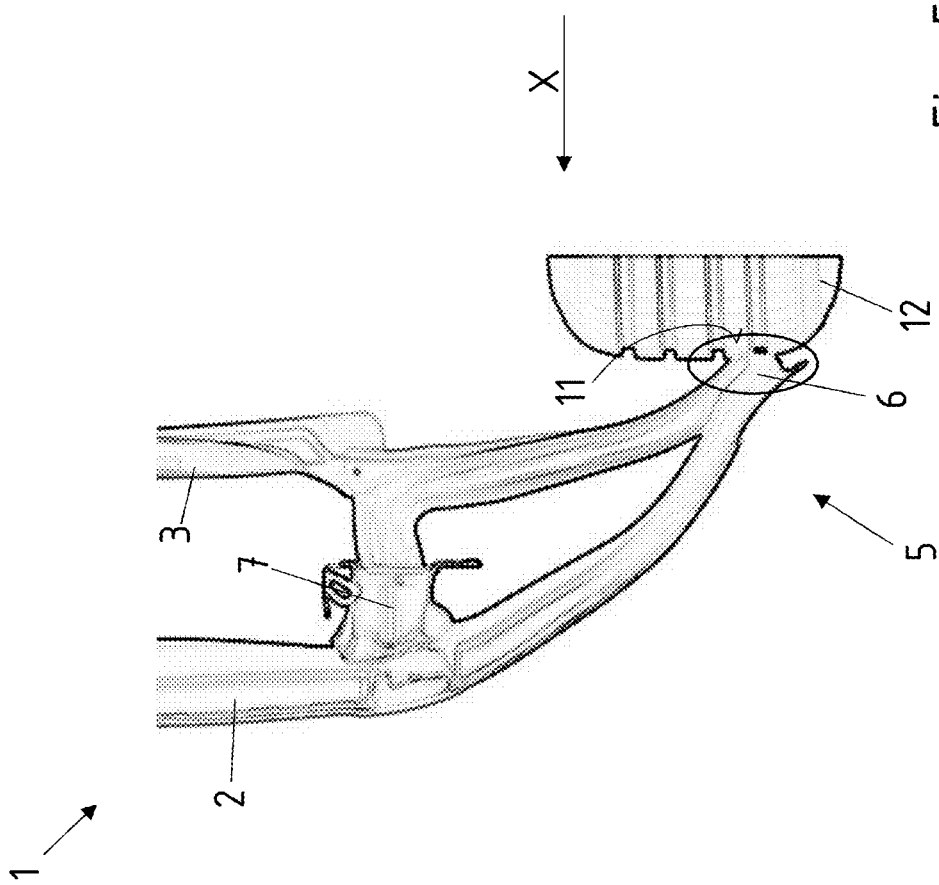

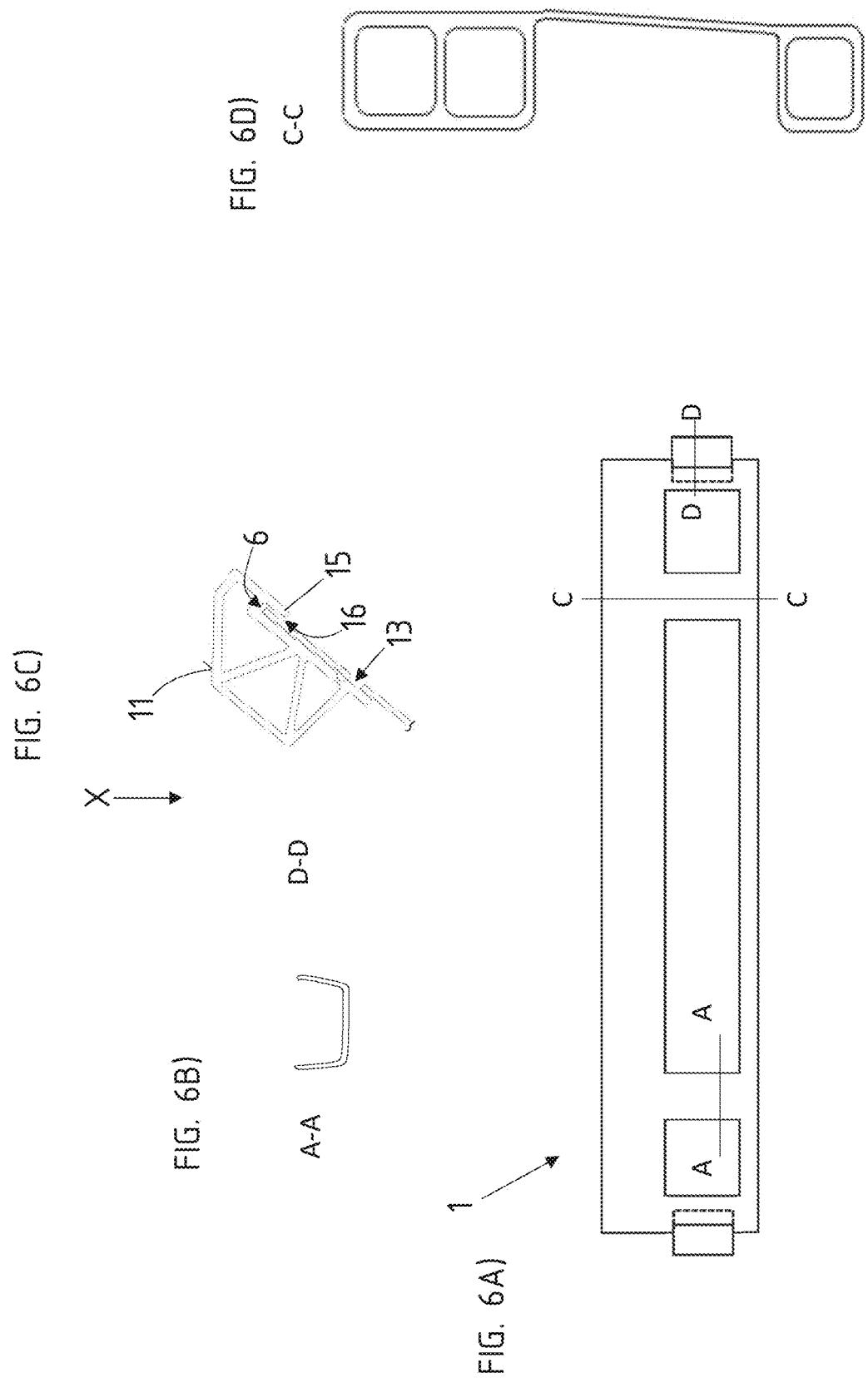

BUMPER ARRANGEMENT WITH END-SIDE HOLLOW PROFILE

RELATED APPLICATIONS

The present application claims priority of German Application Number 10 2021 102 368.8 filed Feb. 2, 2021, the disclosure of which is hereby incorporated by reference herein in its entirety.

The present disclosure relates to a bumper arrangement for a motor vehicle.

Motor vehicles have bumper arrangements at the front and end. In the event of a vehicle crash or a rear-end collision or even an impact against an object, two tasks are fulfilled by such a bumper arrangement. Firstly, there is a crossmember. The crossmember is sufficiently rigid so as to prevent a corresponding object or a motor vehicle from penetrating to too great an extent into the front or end region. Consequently, a possibly punctiform impact, for example, against a post, is transmitted by the crossmember to a large portion of the motor vehicle width.

A second task which is fulfilled by a bumper arrangement is the conversion of crash energy into deformation work and a corresponding reduction of the impact energy as a result. For this purpose, a respective crossmember is coupled to the motor vehicle by way of crash boxes. For this purpose, the crash boxes are arranged between a central region and an end region of the crossmember, in relation to the motor vehicle transverse direction, and, consequently, in relation to the width of the motor vehicle, are each arranged between a third and a quarter of the length in the outer region of the crossmember. The crash boxes are then generally coupled to longitudinal members of the motor vehicle. In the event of an impact, the crash boxes fold, for example, in the manner of a concertina and thus convert crash energy into deformation work.

An object of the present disclosure is to provide a bumper arrangement which has improved crash characteristics, for example, in the end region.

The bumper arrangement for a motor vehicle has an upper main crossmember. Said main crossmember is coupled to the motor vehicle by way of crash boxes, also in relation to the motor vehicle vertical direction, auxiliary crossmember arranged below the main crossmember. The main crossmember and the auxiliary crossmember are coupled to one another by way of vertical struts. The bumper arrangement, thus, the main crossmember and the auxiliary crossmember, extend in this case over at least 70 percent of the vehicle width, more than 75, or more than 80 percent of the motor vehicle width in the motor vehicle transverse direction. These specifications relate to the outer surfaces of the opposite wheels of the front axle.

The bumper arrangement according to the disclosure also has end portions which protrude laterally in the motor vehicle transverse direction with respect to the crash boxes. This means that, in relation to the motor vehicle transverse direction, the crash boxes are not arranged in the end region itself, but rather the main crossmember and the auxiliary crossmember protrude laterally beyond the crash box again.

According to the disclosure, the bumper arrangement is distinguished in that a vertically oriented hollow profile is fastened in an outer portion of the end region.

The hollow profile has a closed cross section. In this case, the closed cross section is in an X-Y plane, thus a plane spanned by the motor vehicle transverse direction and motor vehicle longitudinal direction. A central longitudinal axis of the hollow profile itself is then oriented in the motor vehicle vertical direction. The hollow profile is produced by extrusion, for example, from light metal.

According to the disclosure, the following effect is achieved in conjunction with the width of the bumper arrangement.

The outer end portion of the end region, thus the respectively outer end in the motor vehicle transverse direction, is arranged, in relation to the motor vehicle transverse direction, at the height of a wheel situated behind the end region. In the case of a front bumper arrangement, upon impact against an object, thus in a crash scenario, the bumper arrangement is therefore deformed in the direction toward the motor vehicle, thus in the motor vehicle longitudinal direction. In this case, the crash boxes are deformed and dissipate crash energy through deformation work. The outer portion of the end region then strikes against a wheel arch which is situated behind the end region in the motor vehicle longitudinal direction, and, upon further deformation, against the wheel which is in turn situated behind that in the motor vehicle longitudinal direction. The wheel is supported by way of a wheel suspension. If the intensity of the crash is high enough that the wheel suspension is also deformed, the wheel is furthermore displaced in the motor vehicle longitudinal direction onto a rocker panel located behind it.

By virtue of the hollow profile arranged according to the disclosure, which has a closed cross section of the hollow chamber, further crash energy is able to be dissipated through deformation work. The cross section of the hollow profile deforms upon impact against the wheel arch, and also the wheel, and here dissipates crash energy through deformation work. At the same time, the main crossmember and/or the auxiliary crossmember, individually or in combination, are stiffened, stabilized, and synchronized in terms of their deformation behavior.

Another embodiment is that the surface with which the bumper arrangement strikes against the wheel arch, and/or wheel, located behind the wheel arch, on account of the hollow profile, is increased considerably. The increased supporting surface, for example, a supporting surface having no sharp edges, prevents a situation in which penetration into the wheel results in the tire being cut or burst. Here, a second aspect is the increased surface in the motor vehicle vertical direction so that movement under or under the wheel, thus sliding of the bumper arrangement beyond the top or bottom of the wheel, does not occur. The impact surface is relatively large in relation to the motor vehicle vertical direction, such that the bumper arrangement then also strikes against the wheel and continues to strike against the wheel in the motor vehicle longitudinal direction and does not slide beyond the wheel.

The hollow profile is coupled to the main crossmember and/or the auxiliary crossmember. The hollow profile is able to be coupled to the main crossmember or the auxiliary crossmember at the end and extend in the motor vehicle vertical direction, for example only over approximately the height of the main crossmember. However, the hollow profile is able to also extend over a majority of the height of the entire bumper arrangement in relation to the motor vehicle vertical direction, and thus also connect the main crossmember and the auxiliary crossmember to one another. As a result, the main crossmember and/or the auxiliary crossmember, individually and in combination with one another, are stiffened, stabilized and synchronized in terms of their deformation behavior. The hollow profile is able to also extend between the main crossmember and the auxiliary crossmember.

The main crossmember and the auxiliary crossmember are formed in one piece and in a materially integral manner. This either from a steel alloy in the form of a press-formed component. The main crossmember and the auxiliary crossmember each have a cross-sectional profiling, for example, in a U-shaped, C-shaped, or hat-shaped manner. Closing panels are able to be arranged at least in certain portions, such that the main crossmember or the auxiliary crossmember are each formed as a hollow profile which is closed in certain portions.

Another embodiment provides for the main crossmember and the auxiliary crossmember to be produced from an extruded profile, thus, from a light metal alloy. The main crossmember and the auxiliary crossmember are then formed, in their own right, as a closed hollow profile in cross section.

According to the disclosure, a plurality of vertical struts are arranged and formed between the main crossmember and the auxiliary crossmember in such a way that they stiffen said crossmembers and additionally match them to one another in an improved manner with regard to their deformation behavior.

Vertical struts are formed in one piece and in a materially integral manner, in each case so as to connect the main crossmember and the auxiliary crossmember.

The hollow profile according to the disclosure is then arranged either on its own in the outer portion of the end region so as to connect the main crossmember and the auxiliary crossmember. However, the hollow profile is able to be arranged in the end region in addition to a vertical web formed there in a one-piece and materially integral manner, or additionally on a vertical web which is itself coupled to the main and auxiliary crossmembers. According to the disclosure, additional deformation and an increase in the supporting surface is able to then be achieved.

The hollow profile is able to, in the form of an outer vertical web, couple the main crossmember and the auxiliary crossmember to one another. However, a vertical web, a main crossmember, and auxiliary crossmember are able to be produced in one piece and in a materially integral manner. The hollow profile is then arranged in addition to this already present vertical web.

The hollow profile is arranged on the outer side and/or on the rear side in the direction toward the motor vehicle or the wheel. In the event of a motor vehicle crash, the additional hollow profile thus first strikes against the wheel arch or the wheel located behind the wheel arch.

The coupling is effected in a materially bonded manner by a welding process. However, a riveting process or the like is also conceivable, for example, by pressing.

In the case of an already present vertical web between the main crossmember and the auxiliary crossmember, for example, an additional positively locking coupling is provided. In the event of a crash, tearing off of the hollow profile is able to be prevented in a deliberate manner, since there is firstly a coupling, for example, by way of material bond, and additionally the positively locking coupling represents an enhanced connection specifically in the event of a crash.

Figure 7:
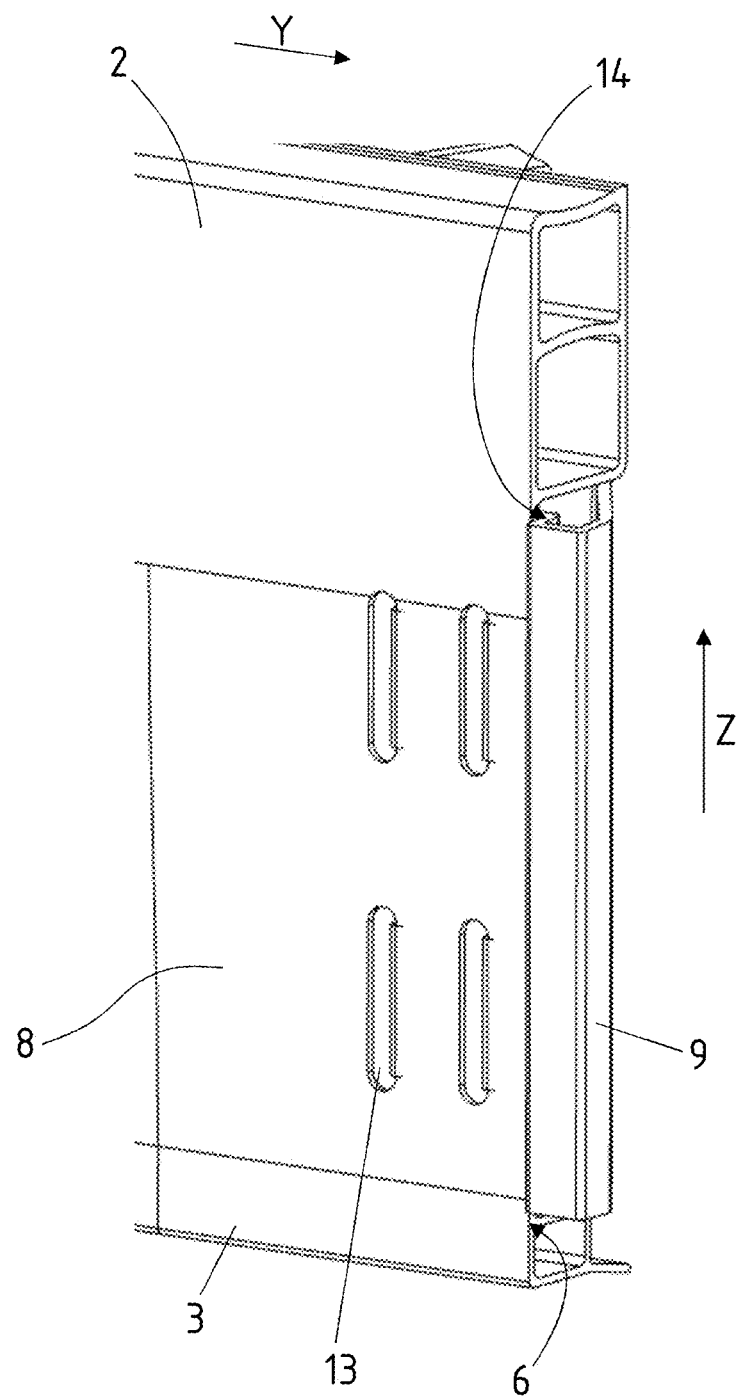
Figure 8C:
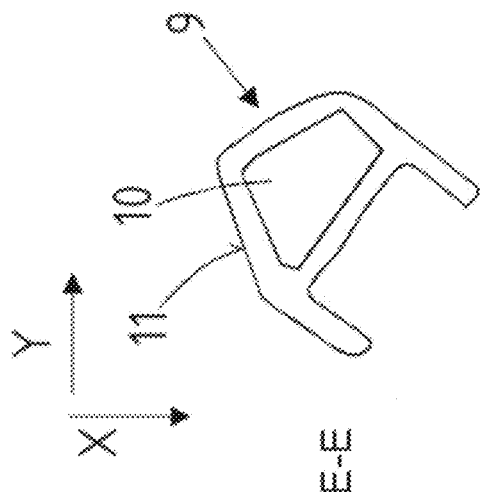
Figure 8B:
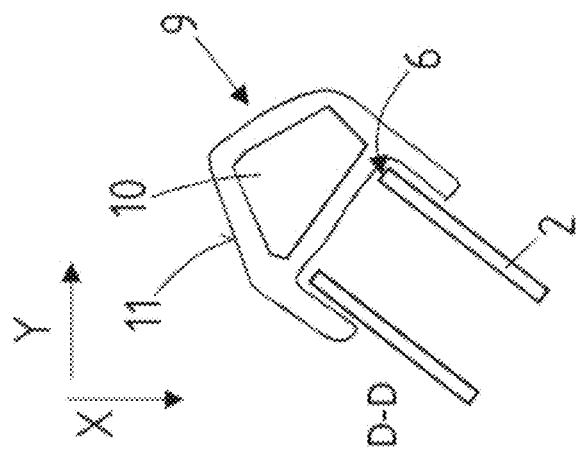
Figure 8A:
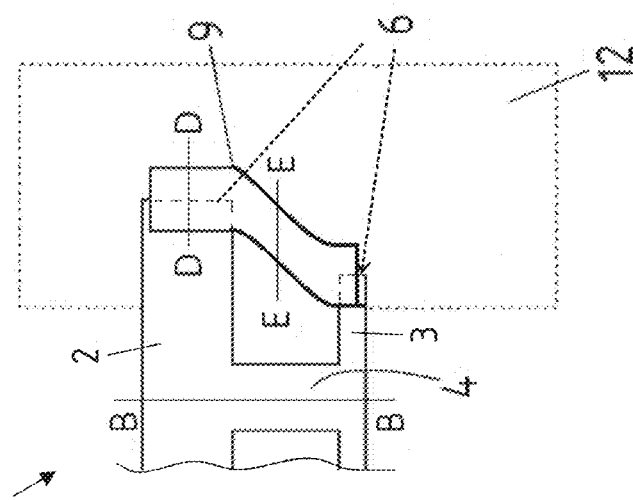

The following description provides further advantages, features, characteristics and aspects of the present disclosure. The embodiments are represented in schematic figures. Said figures serve for ease of understanding of the disclosure. In the figures:

FIG. 1 shows a perspective illustration of a bumper arrangement according to the disclosure, FIG. 2A-FIG. 2D show at least one embodiment of the disclosure in front and transverse views, FIG. 3A-FIG. 3E show at least one embodiment of the disclosure in front and transverse views, FIG. 4A-FIG. 4D show at least one embodiment of the disclosure in front and transverse views, FIG. 5 shows a crash scenario of a bumper arrangement according to the disclosure, FIG. 6A-FIG. 6D show at least one embodiment of the disclosure in front and transverse views, and FIG. 7 shows at least one embodiment of the disclosure in a perspective view of the end region of the bumper arrangement, FIG. 8A-FIG. 8C show a front view of a lateral part of at least one embodiment of the disclosure and two sectional views.

DETAILED DISCLOSURE

In the figures, the same reference designations are used for identical or similar components, even if a repeated description is omitted for the sake of simplicity.

FIG. 1 shows a bumper arrangement 1 according to the disclosure for a motor vehicle (not illustrated in any more detail). The bumper arrangement 1 has an upper main crossmember 2 and an auxiliary crossmember 3 located below said main crossmember in relation to the motor vehicle vertical direction Z. The main crossmember 2 and the auxiliary crossmember 3 are coupled to one another by way of vertical struts 4. An additional vertical element 8 in the form of a connecting web which also couples the main and auxiliary crossmembers 2, 3 to one another is provided in the respective end regions or end portions 5. This forms the outer end 6 of the bumper arrangement 1. The main crossmember 2 is coupled to the motor vehicle (not illustrated in any more detail) by way of crash boxes 7. The vertical struts 4 are able to be supported on the crash boxes 7, which is not illustrated in any more detail.

A respective end portion of the bumper arrangement 1 protrudes laterally beyond the crash boxes 7 in the motor vehicle transverse direction Y.

Figure 2C:
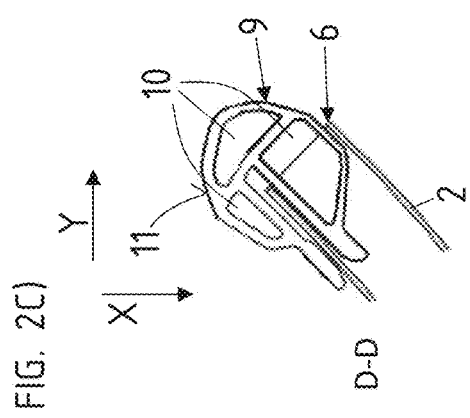
Figure 2B:
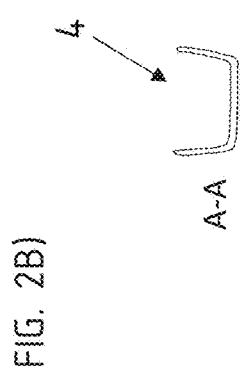
Figure 2A:
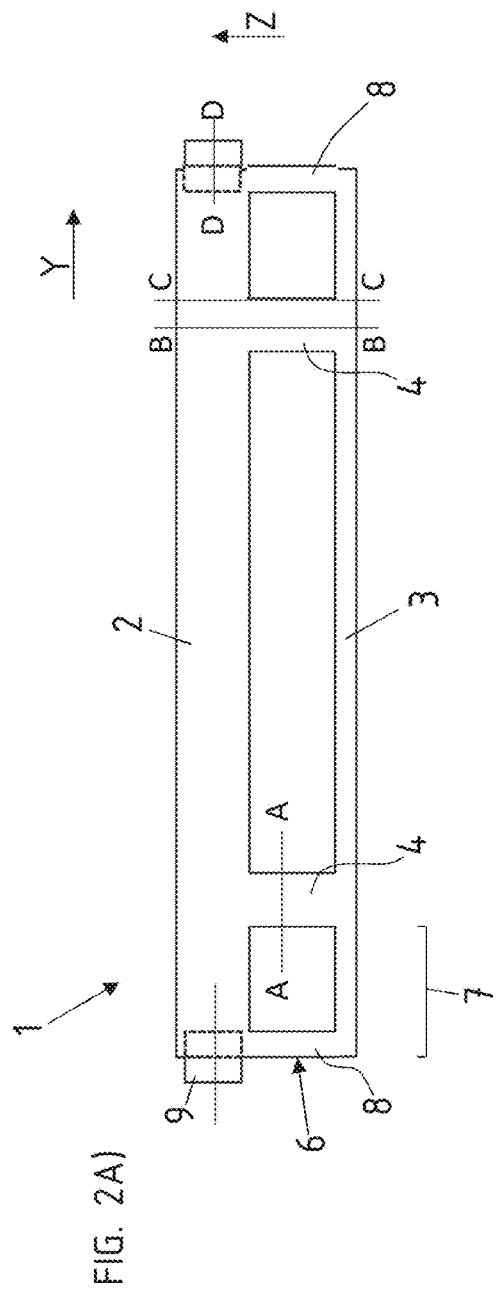

FIG. 2A-FIG. 2E show at least one embodiment of the present disclosure. FIG. 2A shows a front view. In relation to the motor vehicle vertical direction Z, a main crossmember 2 is arranged at the top, and an auxiliary crossmember 3 below the main crossmember 2. The main crossmember 2 and the auxiliary crossmember 3 are coupled to one another in each case by way of vertical struts 4. A vertical connecting strut is additionally fastened at the outer end of the end portion. This vertical connecting strut also connects the main crossmember 2 and the auxiliary crossmember 3. The crash boxes 7 are arranged behind the main crossmember 2, but this is not illustrated in any more detail.

According to the disclosure, a hollow profile 9 is now arranged at the outer end 6, here in the region of the main crossmember 2. A cross-sectional view of the hollow profile 9 along section line D-D is illustrated in FIG. 2C. The hollow profile is inserted at the end at the outer end of the main crossmember 2 and thus protrudes on the outer side beyond the main crossmember 2 in the motor vehicle transverse direction Y, and is able to also be arranged behind the main crossmember 2 in relation to the motor vehicle longitudinal direction X. In this example, the hollow profile has three closed hollow chambers. In the case of deformation in a crash, the hollow chambers thus strike against a wheel (not illustrated in any more detail) located behind them and deform, which permits additional dissipation of crash energy in the form of deformation work. An abutment surface is also formed on a rear side. The abutment surface increases the impact surface of the end 6 of the main crossmember 2 against the wheel (not illustrated in any more detail). All the corners are rounded, such that cutting or bursting of the tire is avoided.

Furthermore, a cross-sectional view through a vertical strut 4 along section line A-A is illustrated in FIG. 2B. Said vertical strut itself is of U-shaped form in cross section. As per the cross-sectional view of the bumper arrangement 1, illustrated in FIG. 2D, the main crossmember 2 and the auxiliary crossmember 3 are formed in one piece and in a materially integral manner, here in the form of an extruded profile. The vertical strut 4 connecting the main crossmember 2 and the auxiliary crossmember 3 is also formed in one piece and in a materially integral manner. As per the front view, FIG. 2A, the remaining regions are processed by cutting, such that here the additional material initially produced during the extrusion is removed by cutting.

FIG. 3A-FIG. 3E show at least one embodiment of the present disclosure. Here, the hollow profile extends over a majority of the height of the bumper arrangement 1 in relation to the motor vehicle vertical direction Z. The hollow profile is able to provide further reinforcement, for example, in the connection between the main crossmember 2 and the auxiliary crossmember 3. However, a vertical connecting strut 4 is additionally formed in each case at the outer-side end. Here, the hollow profile is formed with only one hollow chamber, as per the respective sectional view in FIG. 3C and FIG. 3D. However, the hollow profile is also arranged at the outer end of the main crossmember 2 or at the outer end of the vertical strut 4, thus at the outer end of the bumper arrangement 1, for the purpose of further reinforcement. However, a vertical connecting strut 8 is additionally formed in each case at the outer-side end. Here, the hollow profile 9 is formed with only one hollow chamber 10, as per the respective sectional view in FIG. 3C and FIG. 3D. However, the hollow profile 9 is also arranged at the outer end of the main crossmember 2 or at the outer end of the vertical strut 4, thus at the outer end of the bumper arrangement 1, and protrudes in the motor vehicle transverse direction Y on the outer side and in the motor vehicle longitudinal direction X on the rear side. The abutment surface 11 or impact surface of the hollow chamber 10 thus also strikes against a wheel 12 (not illustrated in any more detail). The abutment surface 11 or impact surface has rounded corners and an increased surface in contrast to the outer end of the main crossmember 2 or of the vertical connecting strut 4. The greater extent of the hollow profile 9 in the motor vehicle vertical direction Z also ensures that movement, in relation to the motor vehicle vertical direction Z, above or below a wheel 12, indicated in FIG. 3A-FIG. 3E, does not occur, but rather the wheel is struck approximately at its central point, such that the bumper arrangement 1 is moved toward the wheel 12.

FIG. 4A-FIG. 4D show at least one embodiment of the present disclosure. Here, too, the bumper arrangement 1 is formed from a main crossmember 2 arranged at the top and an auxiliary crossmember 3 arranged below said main crossmember in the vertical direction.

Here, the hollow chamber 10 arranged at the end of the vertical connecting strut 4 is coupled by plug welds 13. There is also a stepped shoulder 14 by means of which the hollow profile 9 engages around the vertical strut on the outer side. This produces an additional positively locking engagement, for example, in the motor vehicle longitudinal direction X in the case of deformation in a crash. The abutment surface is thus pressed against the outer end of the vertical connecting strut 8 on account of the stepped shoulder 14. This provides an additional strength-increasing measure in the coupling between the hollow profile 9 and the vertical connecting strut 8. In this case, the hollow profile 9 in turn has three hollow chambers 10, which deform correspondingly in the case of abutting contact with a wheel 12 located behind them in the longitudinal direction.

FIG. 5 shows such a deformation, for example, the bumper arrangement 1 in a view from above when a crash has already occurred, and that the crash box 7 has already been compressed. The main crossmember 2 arranged at the top and the auxiliary crossmember 3 located below said main crossmember in the vertical direction are arranged further down. The additional vertical element in the end region 5 has been moved toward a wheel 12 in relation to the motor vehicle longitudinal direction. Said vertical element is now supported on a wheel 12. Contact is able to initially also be made with a wheel arch (not illustrated in any more detail). A further load path via the wheel 12 and, following behind the wheel in the motor vehicle longitudinal direction, a rocker panel (not illustrated in any more detail) would thus be produced. Thus, the main crossmember 2 is introduced into the motor vehicle body not only exclusively via the crash box 7 but also via a second load path, thus via the wheel 12 and the rocker panel located behind the main crossmember 2, in the motor vehicle longitudinal direction. A support surface is produced by the vertical element 6, with the result that the wheel 12 is struck in the motor vehicle longitudinal direction, and movement under or over the wheel 12 due to the rotational connection of the wheel 12 the crash energy is reliably prevented. A large impact surface of the vertical element 6, in conjunction with the main and auxiliary crossmembers 2, 3, in relation to the motor vehicle vertical direction ensures reliable support on the wheel 12. A situation whereby the bumper arrangement 1, for example in the case of only the main crossmember 2, is lifted above the wheel 12, where the main crossmember 2 would correspondingly not be provided with any additional support by the wheel 12, is thus avoided.

FIG. 6A-FIG. 6D show another embodiment of the present disclosure. Said embodiment is constructed substantially analogously to the illustration in FIG. 4A-FIG. 4D. However, not only is a stepped shoulder 14 formed, but the hollow profile 9 in fact overlaps the outer-side end of the vertical web by means of an additional tab 15. A groove 16, into which the outer end of the vertical connecting web is introduced, is formed by this additional tab 15. This also further enhances the positively locking engagement, such that, in the event of a crash, tearing off and striking of the abutment surface 11 against a wheel 12 located behind it in the motor vehicle longitudinal direction X tearing off or any other damage to the hollow profile 9 and the vertical connecting web avoided in a targeted manner. Here, too, the hollow profile 9 is again equipped with three hollow chambers 10, and is coupled to the vertical connecting web by means of a plug weld.

FIG. 7 shows another embodiment. The plug welds 13 are configured in each case in the form of elongate holes. The hollow profile 9 engages around the outer end by means of a stepped shoulder 14 and protrudes laterally beyond the outer end on the outer side in the motor vehicle transverse direction Y.

FIG. 8A-FIG. 8C show another embodiment of the present disclosure. Here, an outer part of the bumper arrangement 1 according to the disclosure is illustrated in a front view. The main crossmember covers a majority of the wheel 12 located behind it. By contrast, the auxiliary crossmember 3 is formed so as to be shorter in the motor vehicle width. The hollow profile 9, which is additionally arranged vertically, is thus arranged so as to run oriented in the motor vehicle vertical direction Z, but obliquely downward. In this way, sufficient support on the wheel arch, and/or wheel 12, located behind the wheel arch is achieved in the event of a head-on crash. The vertically arranged hollow profile 9 is thus bent obliquely downward in the motor vehicle transverse direction Y. The hollow profile 9 is inserted into the outer end 6 of the upper crossmember and into the outer end 6 of the lower crossmember, and coupled therein. As per section line E-E, there is no additional vertical strut at the end. This makes it easier to assemble the bumper arrangement 1 according to the disclosure, since here the upper main crossmember 2 and the lower auxiliary crossmember 3 is able to be produced with different lengths. The outer hollow profile 9 is able to compensate the offset in the motor vehicle transverse direction Y. Said hollow profile is coupled at the ends 6, for example by means of screws or in a materially bonded manner, for example, by welding.

In all embodiments, the main crossmember 2 and the auxiliary crossmember 3 are produced from light metal, for example, aluminum components. However, a steel component is able to be combined with a hollow profile, which has been produced in the form of an aluminum component.

The invention claimed is:

1. A bumper arrangement for a vehicle, comprising:
    an upper main crossmember, wherein the upper main cross member is able to be coupled to the vehicle by a crash box;
    a lower auxiliary crossmember, wherein the upper main crossmember and the lower auxiliary crossmember are connected together by a vertical strut, wherein
    the bumper arrangement extends over at least 70% of a width of the vehicle,
    the upper main crossmember and the lower auxiliary crossmember each have end portions which protrude laterally in a transverse direction with respect to the crash box,
    the upper main crossmember and the lower auxiliary crossmember are integral;
    a vertically oriented hollow profile is in an outer portion of the end portions; and
    in the outer portion of the end portions, a vertical connecting strut is between the upper main crossmember and the lower auxiliary crossmember.

2. The bumper arrangement according to claim 1, wherein the vertically oriented hollow profile is able to be coupled to the upper main crossmember or the lower auxiliary crossmember.

3. The bumper arrangement according to claim 1, wherein an abutment surface is on a rear side surface of the vertically oriented hollow profile directed toward a wheel of the vehicle, the abutment surface has a surface area greater than a surface area of the end portions.

4. The bumper arrangement according to claim 1, wherein the vertically oriented hollow profile has outer edges which are rounded.

5. The bumper arrangement according to claim 1, wherein the upper main crossmember, the lower auxiliary crossmember, and the vertical connecting strut define an integral component.

6. The bumper arrangement according to claim 5, wherein, relative to the vertical connecting strut, the vertically oriented hollow profile is oriented in a direction toward the vehicle.

7. The bumper arrangement according to claim 5, wherein the vertically oriented hollow profile is coupled to the vertical connecting strut in a bonded manner.

8. The bumper arrangement according to claim 5, wherein the upper main crossmember and the lower auxiliary crossmember are a press-formed component.

9. The bumper arrangement according to claim 5, wherein the upper main crossmember and the lower auxiliary crossmember are an extruded profile.

10. The bumper arrangement according to claim 5, wherein the upper main crossmember has an indentation configured to initially deform when a force or a load is applied in the longitudinal direction of the vehicle.

11. The bumper arrangement according to claim 5, wherein the vertically oriented hollow profile is coupled to the vertical connecting strut in a positive locking manner.

12. The bumper arrangement according to claim 5, wherein the upper main crossmember and the lower auxiliary crossmember comprise a steel alloy.

13. The bumper arrangement according to claim 5, wherein the upper main crossmember and the lower auxiliary crossmember comprise a light metal alloy.

14. A bumper arrangement for a vehicle, comprising:
    an upper main crossmember, wherein the upper main cross member is able to be coupled to the vehicle by a crash box;
    a lower auxiliary crossmember, wherein the upper main crossmember and the lower auxiliary crossmember are connected together by a vertical strut, wherein
    the bumper arrangement extends over at least 70% of a width of the vehicle,
    the upper main crossmember and the lower auxiliary crossmember each have end portions which protrude laterally in a transverse direction with respect to the crash box,
    the upper main crossmember and the lower auxiliary crossmember are integral;
    a vertically oriented hollow profile is in an outer portion of the end portions, the vertically oriented hollow profile, in cross section, is closed at least over a portion along a length of the vertically oriented hollow profile; and
    in the outer portion of the end portions, a vertical connecting strut is between the upper main crossmember and the lower auxiliary crossmember.

* * * * *